Raymond L. Betts
John D. Leslie  Inventors

By W. D. Heilman  Attorney

Patented Jan. 20, 1953

2,626,291

UNITED STATES PATENT OFFICE 2,626,291

SOLID PHOSPHORIC ACID SLURRY POLYMERIZATION PROCESS

Raymond Livingston Betts, Westfield, and John D. Leslie, Cranford, N. J., assignors to Standard Oil Development Company, a corporation of Delaware Application October 19, 1950, Serial No. 190,991

11 Claims. (Cl. 260—683.15)

The present invention is concerned with the polymerization of olefins and is more particularly concerned with an improved polymerization catalyst having a high activity and a strong structural formation. The invention is more particularly concerned with a slurry operation wherein agglomeration of the catalyst is prevented without the loss of activity or life of the catalyst. In accordance with the present process a high activity polymerization catalyst is utilized in conjunction with a partially acidified diluent which preferably comprises silica gel.

It is well known in the art to treat olefins and olefin-containing streams with various catalysts, as for example, phosphoric acid in order to polymerize the olefins to higher boiling hydrocarbon constituents. In general, the feed streams comprise normally gaseous olefins, such as ethylene, propylene, butylenes, pentylenes and mixtures thereof, which are polymerized to hydrocarbon constituents which boil in the range below about 420° F. Although 100° olefinic streams may be utilized as feed stocks, it is generally preferred to have paraffinic diluents present in the range of from about 40% to 90% by weight in order to reduce the formation of carbonaceous deposits on the catalyst and to provide better temperature control in the catalyst bed. These phosphoric acid catalysts are usually deposited on solid carriers, as for example, diatomaceous earth, kieselguhr, silica gel, and the like. In general, these catalysts are satisfactory for securing the polymerization of the olefins in the feed stream. However, there exist certain inherent disadvantages with respect to their use in that the activities of the catalysts are not as high as it is desired. A particularly undesirable characteristic of catalysts heretofore used is that their structural strength is relatively weak, resulting in premature failures and disintegration of the same. This is particularly the case when a slurry operation is utilized wherein the reactants are in the liquid phase.

According to one aspect, the present invention relates to the polymerization of a mixed olefin feed, containing for example, ethylene, propylene and butylene by contacting these gases with a polymerizing catalyst while agitating at temperatures in the range of 350°–600° F. and pressures above those required to condense the gases at the critical temperature, i. e., pressures above the critical.

The manner in which the present process is carried out will be fully understood from the following description when read with reference to the accompanying drawings wherein.

Figure 1:
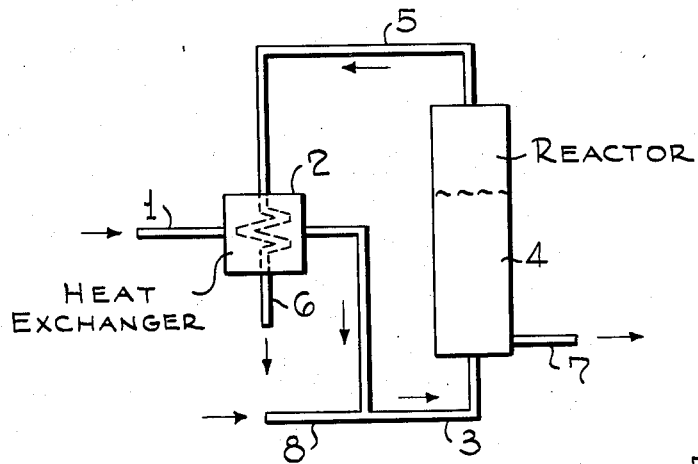
Figure 1 is a diagrammatic flow drawing illustrating one embodiment of this invention in which the catalyst is maintained in suspension by means of feed flowing upwardly therethrough.

In one specific embodiment, the present invention comprises a process for the production of normally liquid hydrocarbons from a normally gaseous olefin fraction comprising propylene and butylene by passing the normally gaseous olefin fraction upwardly through a finely divided polymerization catalyst (140–200 mesh) at a temperature between 350 and 600° F., superatmospheric pressure of about 1000 lbs./sq. in. or more and at a velocity of one to two feet per minute. By operating in this manner, the olefin fraction is thoroughly mixed with the catalyst which is kept in suspension in the material being polymerized. The pressure is kept above the critical to avoid at any time the coexistence of a gaseous and liquid state. At these temperatures and pressures the olefins are in that nebulous state wherein it is difficult to determine whether the material is liquid or gaseous, the change from one to the other occurring gradually and without discontinuity. It follows, therefore, that at any given time the mixture of olefins and finely divided catalyst may be called either a slurry or a fluidized mass, the change from one to the other not being perceptible, although both states are not present simultaneously.

According to another embodiment of the invention, the catalyst is maintained in suspension in the olefins by mechanical agitation instead of by the flow of the olefin fluid.

According to still another embodiment of the invention, the olefins are preheated and compressed and mixed with a slurry of the catalyst in a heavy oil and passed through a polymerization zone. Products, catalyst and heavy oil are passed together to a disengaging drum where product is separated overhead and the slurry of catalyst in heavy oil is separated and recycled to the reaction zone.

As an essential feature of this invention the olefin polymerization must be conducted in the presence of a finely divided adsorbent material in addition to the catalyst. In addition in accordance with the present invention, the adsorbent material is one containing a relatively small amount of phosphoric acid. When operating in this manner, not only is agglomeration prevented but the activity of the entire catalyst mass is maintained at a relatively high level.

When the process was carried out in the absence of an adsorbent, fluidization was not obtained even at fluid velocities of 5 feet per minute and the catalyst was found to have agglomerated in lumps. However, by operating in the presence of catalyst mixed with 10-50% of finely divided silica gel, excellent fluidization was obtained at fluid velocities of 1.5 feet per minute and the catalyst did not agglomerate.

The finely divided adsorbent may suitably comprise any adsorbent material such as silica gel, bauxite, activated alumina, etc., but silica gel is preferred.

The catalyst which has been found suitable for this process comprises a composite of phosphoric acid on kieselguhr or silica gel. The phosphoric acid may be present in amounts between 50 and 90% and may be promoted with 1 to 5% nickel or copper phosphate. One suitable composition consists of 78% phosphoric acid supported on 20% silica gel and promoted with 2% nickel phosphate activated at a temperature between 500 and 800° F.

The invention will be further explained in connection with the accompanying diagrammatic flow drawings which illustrate several specific embodiments of the invention, but not with the intention of unduly limiting the same.

Referring to Figure 1, a normally gaseous $C_3$, $C_4$ hydrocarbon fraction containing 50% paraffins and 50% olefins, the latter consisting of 50% propylene and 50% butylene, is introduced at 100° F. and about 125 lbs./sq. in. gage by line 1 to heat exchanger 2 where it is heated to 250° F. The heated feed is then introduced by line 3 into the bottom of reaction zone 4 maintained under 1000 lbs./sq. in. gage pressure and at a temperature of 450° F. The reaction zone contains a finely divided catalyst consisting of phosphoric acid deposited on kieselguhr of about 140-200 mesh. The feed is introduced upwardly through this catalyst at about 1 to 2 feet per minute so that the catalyst is maintained in suspension in the feed. Thus the more dense catalyst particles will lag behind the less dense olefins and the catalyst will concentrate in the lower portion of the reaction zone in a dense phase mass which acts as if it had a level similar to a boiling liquid. However, the conditions are set within the reaction zone so that actually there is only one fluid phase present. These conditions are preferably near the critical temperature and pressure for a 50:50 mixture of polymer and $C_3$, $C_4$ components but outside the region in which two fluid phases appear. Pressures of about 1000 lbs./sq. in. gage in the reaction zone have been found suitable to maintain this single phase.

There is very little catalyst if any above the pseudo level within the reactor and little or no catalyst entrainment occurs.

As pointed out above, it is necessary to maintain an additional adsorptive agent in the reaction zone to prevent agglomeration of the catalyst. Accordingly, there is interdispersed with the catalyst about 10-50% by weight of finely divided silica gel of from 140-200 mesh. This silica gel presumably acts to adsorb solid or high boiling polymers formed initially, although this invention is not intended to be limited by any theory as to the action of the silica gel.

The proper state of hydration of the catalyst, if necessary, may be maintained by the introduction of regular quantities of water. This is not illustrated in the drawing but may readily be accomplished by well known means.

The products from zone 4, boiling for the most part in the motor fuel boiling range, are removed, substantially free from catalyst, by line 5 and passed through heat exchanger 2 where they give up heat to incoming feed. The cooled products are then passed by line 6 to any desired fractionating or stabilizing means, not shown.

From time to time catalyst is removed from reaction zone 4 through line 7 and burned or otherwise disposed of. Makeup catalyst is added by line 8. The process is thus non-regenerative.

Figure 2:
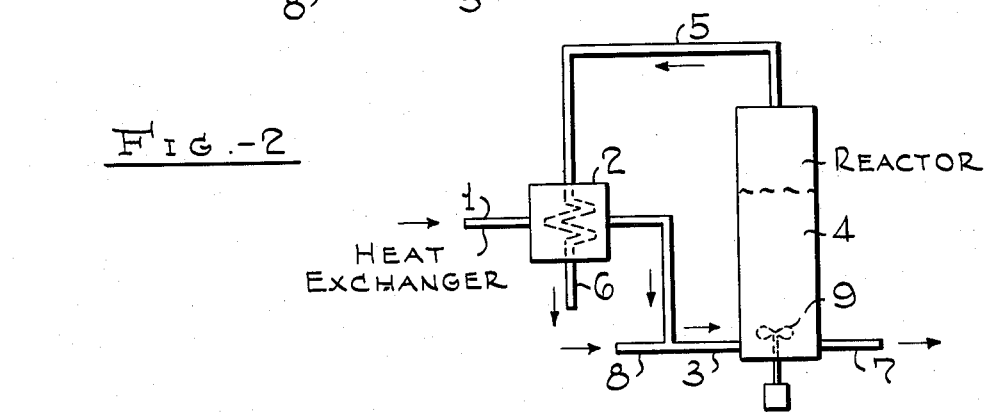
Figure 2 represents another embodiment of the invention in which the catalyst is maintained in suspension by means of mechanical agitation.

In order to maintain a more positive agitation of the fluidized catalyst in the reaction zone 4, and to permit greater flexibility in feed rates, a mechanical stirring device may be used, as for example, agitator 9 shown in Figure 2. The operation of the apparatus in Figure 2 is otherwise the same as in Figure 1.

Figure 3:
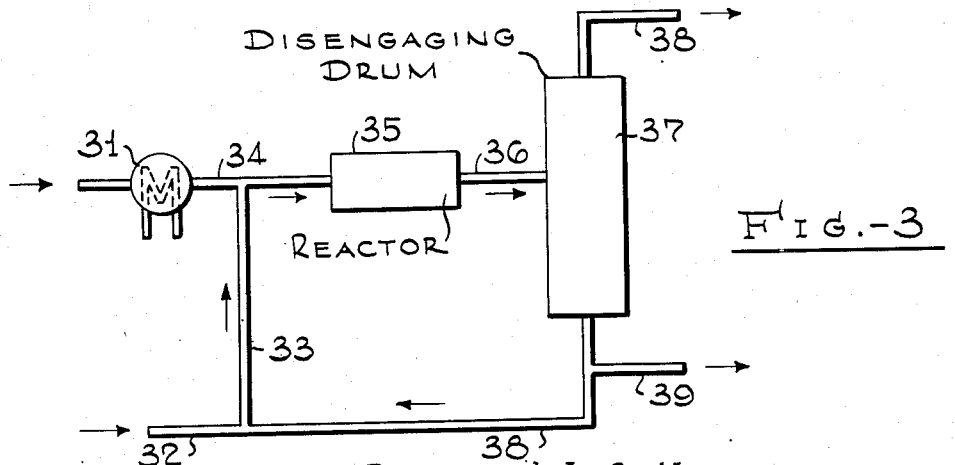
Figure 3 represents an embodiment of the invention in which the catalyst is maintained as a slurry in a heavy oil and the slurry is recycled to the reaction zone.

A somewhat different embodiment of the invention is shown in Figure 3. According to this embodiment the propylene - butylene - paraffin mixture is passed through line 30 to preheater 31 where it is heated to 470° F. and compressed to 1000 lbs./sq. in. gage. The preheated and compressed feed is slurried with finely divided phosphoric acid catalyst on kieselguhr mixed with 10-50% by weight of finely divided silica gel flowing through lines 32 and 33. The catalyst and silica gel are preferably slurried with a high boiling hydrocarbon oil to enable them to be easily passed through the equipment lines. The mixture of olefins, catalyst, and silica gel are then passed by line 34 to reaction zone 35 where they are maintained in contact for a sufficient length of time at about 470° F. and about 1000 lbs. to convert the feed into the desired motor fuel product. The mixture of unreacted olefins, catalyst, silica gel and product are passed by line 36 to disengaging drum 37 where the pressure is reduced to 75 lbs./sq. in. gage. As a result of the reduction in pressure the products are vaporized and pass overhead through line 38 for further treatment as desired. Catalyst, and silica gel, slurried in the high boiling hydrocarbon oil are removed from disengaging drum 37 by line 38 and recycled to the reactor through lines 33 and 34. From time to time a small amount of catalyst may be removed from the system through line 39. Fresh catalyst and silica gel are added to the sytem through line 32.

Reaction zone 35 may be a fired coil or it may be an enlarged chamber or drum.

In order to further illustrate the invention the following examples are given:

*Example 1*

Operations were conducted wherein normally gaseous mixtures of 25% by weight of propylene, 25% by weight of butene-2 and 50% by weight of propane were passed upwardly through a finely divided (140-200 mesh) catalyst consisting of phosphoric acid on kieselguhr in combination with silica gel at a temperature ranging between 175° and 450° F. and under a 1000 lbs./sq. in. gage and velocities up to 5 feet per minute. No agglomeration of the catalyst resulted. In all operations the catalyst comprised 80% by weight of phosphoric acid on kieselguhr and 20% by weight of a silica gel diluent. In operation 1 the silica gel was free of acid whereas in operations 2 and 3 the silica gel was treated with acid. In operation 2 the free acid content of the silica gel was 7.6 by weight whereas in operation 3 the free acid content was 39% by weight. Furthermore, in operation 3 the acid-treated silica gel was air dried at a temperature of about 200° F. The results of these operations are as follows:

| Diluent | 1 | 2 | 3 |
|---|---|---|---|
| | Untreated silica gel | Acid-treated silica gel | |
| | | A | B |
| Run, hours | 650 | 240 | 415 |
| Space vel. (gal./hr./lb.[1]) | 0.6–0.7 | 1.1 | 1.1 |
| Initial conv. (weight percent) | 86 | 93 | 88 |
| Final conv. (weight percent) | 65 | 86 | 80 |
| Catalyst life (gal./lb.[1]) | 96 | 90 | 130 |

[1] Basis is 1 lb. of true catalyst.

From the above it is apparent that a diluent having a relatively small concentration of acid is very effective in preventing agglomeration and also in maintaining a high catalyst activity. In both operations 2 and 3 the total acid on the diluent was 20 to 25% lower than on a normal polymerization catalyst.

It has already been suggested that agglomeration may be prevented by the use of a diluent such as silica gel. The diluent should have the same surface adsorptive capacity and about the same fluid characteristics as the catalyst itself. Silica gel met these requirements and was shown to be a satisfactory diluent, except that it slowly picked up free phosphoric acid from the catalyst, thereby rendering the latter less active. The net result was poor catalyst life. However, the pickup of acid on the diluent did not impair the diluent's capacity to prevent agglomeration. The catalytic activity of silica gel containing a small amount of free-phosphoric acid (0–3 wt. per cent) is slight.

Having described the invention, it is claimed:

1. In the non-regenerative catalytic process of polymerizing olefins in which an olefin feed is continuously introduced into a reaction zone containing a cosuspension of finely divided solid phosphoric acid catalyst and finely divided solid diluent in fluid hydrocarbon under polymerization conditions and substantially solid-free effluent containing polymerized olefins is continuously withdrawn from said zone while said catalyst and diluent are maintained in said suspension within said zone, said catalyst containing in the range of 50 to 90% by weight of phosphoric acid and said diluent being used in an amount sufficient to prevent substantial catalyst agglomeration and being selected from the class consisting of silica gel, bauxite and alumina, the improvement in which said diluent contains deposited thereon a relatively small amount of phosphoric acid, said amount being at least about 20% less acid than is contained on said catalyst and being sufficient to minimize loss of activity of said catalyst.

2. Process according to claim 1 in which the catalyst diluent is silica gel.

3. Process according to claim 2 in which the diluent is present in an amount equal to about 10–50% by weight of the catalyst and the temperature is maintained between 350 and 600° F. and the pressure at about 1000 pounds per square inch gage.

4. Process according to claim 2 in which the catalyst is phosphoric acid on kieselguhr.

5. A process in accordance with claim 1 wherein said suspension is formed by passing said olefin upwardly through said catalyst and diluent.

6. A process in accordance with claim 1 wherein said suspension is formed by mechanically agitating said olefin, catalyst, and diluent.

7. A process in accordance with claim 1 wherein said suspension is formed by admixing said olefins with a slurry comprising said catalyst and diluent in a heavy oil.

8. In the non-regenerative catalytic process of polymerizing olefins in which a finely divided catalyst comprising in the range of 50 to 90% by weight of phosphoric acid deposited on a solid carrier is maintained as an agitated suspension in a fluid hydrocarbon at a temperature in the range of 350° to 600° F. and a polymerization pressure above the critical whereby a single fluid hydrocarbon state is maintained, and in which olefin feed is continuously introduced into the said suspension while substantially solid-free effluent containing polymerized olefins is continuously withdrawn from said zone while maintaining said catalyst within said suspension in said zone, the improvement which comprises interdispersing with said catalyst in the range of 10 to 50% by weight, based on said catalyst, of a finely divided solid diluent comprising silica gel whereby a cosuspension of said catalyst and said diluent is maintained and substantial agglomeration of said catalyst is prevented, said diluent being characterized by containing a small amount of phosphoric acid deposited thereon, said amount being at least 20% less acid than is contained on said catalyst and is sufficient to prevent substantial loss of activity of said catalyst.

9. A process in accordance with claim 8 wherein said suspension is formed by passing said olefin upwardly through said catalyst and diluent.

10. A process in accordance with claim 8 wherein said suspension is formed by mechanically agitating said olefin, catalyst, and diluent.

11. A process in accordance with claim 8 wherein said suspension is formed by admixing said olefins with a slurry comprising said catalyst and diluent in a heavy oil.

RAYMOND LIVINGSTON BETTS.
JOHN D. LESLIE.

REFERENCES CITED

The following references are of record in the file of this patent:

UNITED STATES PATENTS

| Number | Name | Date |
|---|---|---|
| 2,354,261 | Hemminger | July 25, 1944 |
| 2,393,909 | Johnson | Jan. 29, 1946 |
| 2,397,945 | Burney et al. | Apr. 9, 1946 |